United States Patent [19]
Matthews et al.

[11] Patent Number: 5,986,234
[45] Date of Patent: Nov. 16, 1999

[54] HIGH REMOVAL RATE LASER-BASED COATING REMOVAL SYSTEM

[75] Inventors: Dennis L. Matthews, Moss Beach; Peter M. Celliers, Berkeley; Lloyd Hackel, Livermore; Luiz B. Da Silva, Danville; C. Brent Dane, Livermore; Stanley Mrowka, Richmond, all of Calif.

[73] Assignee: The Regents of the University of California, Oakland, Calif.

[21] Appl. No.: 08/829,519

[22] Filed: Mar. 28, 1997

[51] Int. Cl.[6] .................................................. B23K 26/00
[52] U.S. Cl. ........................................................ 219/121.68
[58] Field of Search ...................... 219/121.68, 121.69, 219/121.78, 121.74, 121.62; 359/334, 347, 348, 569; 372/94, 106; 134/1

[56] References Cited

U.S. PATENT DOCUMENTS

| | | | |
|---|---|---|---|
| 4,521,075 | 6/1985 | Obenschain et al. | 359/569 |
| 4,563,567 | 1/1986 | Geffroy et al. | 219/121.78 |
| 4,588,885 | 5/1986 | Lovoi et al. | 250/226 |
| 4,737,628 | 4/1988 | Lovoi | 250/226 |
| 4,756,765 | 7/1988 | Woodroffe | 134/1 |
| 4,896,015 | 1/1990 | Taboada et al. | 219/121.78 |
| 4,970,600 | 11/1990 | Garnier et al. | 219/122.69 |
| 5,105,429 | 4/1992 | Mundinger et al. | 372/34 |
| 5,105,430 | 4/1992 | Mundinger et al. | 372/35 |
| 5,151,134 | 9/1992 | Boquillon et al. | 134/1 |
| 5,194,723 | 3/1993 | Cates et al. | 250/205 |
| 5,204,517 | 4/1993 | Cates et al. | 250/205 |
| 5,239,408 | 8/1993 | Hackel et al. | 359/338 |
| 5,281,798 | 1/1994 | Hamm et al. | 219/121.62 |
| 5,285,310 | 2/1994 | Miller et al. | 359/338 |
| 5,300,756 | 4/1994 | Cordingley | 219/121.69 |
| 5,328,517 | 7/1994 | Cates et al. | 134/7 |
| 5,662,762 | 9/1997 | Ranalli | 219/121.69 |
| 5,689,363 | 11/1997 | Dane et al. | 359/334 |
| 5,751,588 | 5/1998 | Freedenberg et al. | 219/121.74 |
| 5,780,806 | 7/1998 | Ferguson et al. | 219/212.68 |

FOREIGN PATENT DOCUMENTS

| | | |
|---|---|---|
| 4-309478 | 11/1992 | Japan . |
| 7-47483 | 2/1995 | Japan . |

OTHER PUBLICATIONS

Katherine Liu and Elsa Garmire, "Paint removal using lasers," Applied Optics, vol. 34, No. 21, pp. 4409–4415, Jul. 20, 1995.

*Primary Examiner*—Geoffrey S. Evans
*Attorney, Agent, or Firm*—John P. Wooldridge

[57] ABSTRACT

A compact laser system that removes surface coatings (such as paint, dirt, etc.) at a removal rate as high as 1000 ft$^2$/hr or more without damaging the surface. A high repetition rate laser with multiple amplification passes propagating through at least one optical amplifier is used, along with a delivery system consisting of a telescoping and articulating tube which also contains an evacuation system for simultaneously sweeping up the debris produced in the process. The amplified beam can be converted to an output beam by passively switching the polarization of at least one amplified beam. The system also has a personal safety system which protects against accidental exposures.

10 Claims, 7 Drawing Sheets

HIGH REMOVAL RATE LASER-BASED COATING REMOVAL SYSTEM

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to removal of coatings from surfaces, and more specifically, it relates to the use of a high power, short pulse laser system in a compact unit for surface coating removal.

2. Description of Related Art

Pulsed high intensity light can be used to remove paint and other types of layered coatings from surfaces such as masonry, wood, concrete, metal signs, metal beams and most other materials used in the construction of buildings, bridges, statues, roads, boats, airplanes, etc. The source of the radiation may be coherent or incoherent such as from flashlamps, arc-lamps or lasers. If the light pulse is controlled properly it can remove most coatings without damaging underlying surfaces. Several mechanisms for coating removal operate depending on the absorption mechanisms and the pulse duration. Flashlamp or laser-based removal systems with pulse durations in the range from 1 $\mu$s to 300 $\mu$s remove coatings through a thermal process (vaporization) and have been used in the field of art conservation for many years. Patents employing the flashlamp method for industrial paint removal have since been developed (U.S. Pat. No. 5,281,798). The combination of flashlamp heating with an abrasive particle flux has also been used for aircraft paint stripping (U.S. Pat. No. 5,194,723).

Coating removal without damaging the substrate requires pulse durations substantially shorter than a millisecond, such that the deposition of energy into the coating is terminated before significant heat is conducted into the substrate. This process has been previously described by Woodroffe (U.S. Pat. No. 4,756,765) and also by Lovoi (U.S. Pat. No. 4,737,628). In general, lasers are useful in this application because they can produce high energy density short pulses that can be controlled and which may be of nearly arbitrary duration. In the particular case of pulse durations shorter than about 30 to 50 ns, the deposition of energy occurs in a time scale shorter than the acoustic relaxation time in the surface layer. Such pulse durations can usually be produced only by Q-switched lasers. In this situation, the laser-deposited energy initiates a pattern of photoacoustic stress waves which result in removal of the coating through spallation and not through thermal vaporization. The coating material is separated from the surface in the form of a powder or flakes which can be easily removed as with a vacuum system without contaminating the environment. The short pulse mode of removal has been patented by Boquillon et al. (U.S. Pat. No. 5,151,134) in the field of cleaning pollutants from surfaces. For most purposes, the short pulse removal method (pulse duration <30 ns) is the most efficient means for coating removal. The empirical dependence of removal rate on pulse duration has been investigated by Liu and Garmire (Appl. Optics 34, 4409 (1995)).

The systems and methods described in prior art do not address several key issues that limit this technique to specialized areas or small scale applications. Firstly, all methods and devices are based on conventional technologies for producing the radiant energy source (e.g. commercially available Nd:glass or Nd:YAG systems, pulsed TEA $CO_2$ laser systems, or pulsed flashlamps). These systems are limited to coating removal rates less than approximately 200 $ft^2$/hr. In the case of flashlamp and TEA $CO_2$ lasers, the ablation mode is thermal vaporization, which requires approximately 16 $J/cm^2$-mil of laser fluence to remove paint. Q-switched Nd:YAG and Nd:glass pulses are more efficient (around 1 $J/cm^2$-mil). For removal rates substantially larger than 200 $ft^2$/hr, a coating removal system requires several ×100 W to several times 1 kW of Q-switched Nd laser power, and 1 kW to several times 10 kW of pulsed TEA $CO_2$ power.

Flashlamps are inherently more efficient than laser systems and may also be scaled to high average powers, although the radiant energy they produce is far less amenable to precise pulse control, and long distance propagation. The lamp envelope must be placed in close proximity to the surface being cleaned. Commercial Nd:YAG and Nd:glass laser systems are based on master oscillator-power amplifier configurations in which most of the pulsed energy is extracted from a chain of increasingly sized rods or slabs of the gain medium. These designs cannot be scaled to high average power (e.g. by adding more flashlamps and laser rods) without greatly increasing the bulk and/or complexity of the system.

Also associated with the use of a high average power laser system is the need to automate the delivery of the laser energy so that it is used efficiently, effectively and safely. Lasers that deliver high average power optical beams cannot be controlled or directed manually, such as with simple handpieces. Feedback control of the laser power is essential in order to limit the application of laser energy precisely when the surface coating has been removed and the desired underlying layers have been exposed. Feedback sensors for radiant coating removal systems have been described using various means to assess the degree of removal of the surface coating. These include spectral and spatial reflectivity sensors (U.S. Pat. Nos. 4,588,885 and 4,737,628), photoacoustic pressure sensors (U.S. Pat. No. 5,194,723), reflected color intensity sensors (U.S. Pat. No. 5,281,798) and spectral emission sensors (U.S. Pat. No. 5,204,517).

In summary there is a need for a compact laser system with a scalable design that can reach kW power levels, operate at wavelengths from the UV to the near IR, with pulse durations in the range of 10 to 30 ns, and which can be integrated into a system for surface coating removal.

SUMMARY OF THE INVENTION

It is an object of the present invention to provide a high removal rate laser-based coating removal system.

It is another object to provide a compact laser system with a scalable design that can reach kW power levels, operate at wavelengths from the UV to the near IR, with pulse durations in the range of 10 to 30 ns, and which can be integrated into a system for surface coating removal.

This invention is a compact laser system for removal of surface coatings (such as paint, dirt etc.) at a removal rate as high as 1000 $ft^2$/hr or more. It includes features that provide a means to strip paint or other coatings from any surface without damaging the surface. The invention also includes a means for simultaneously cleaning up the debris produced in the process. The invention consists of a high repetition rate Nd:YAG or Nd:glass laser operated at 0.1 to 1 $J/cm^2$ fluence, 5 to 20 nsec pulse duration and 1.06 $\mu$m wavelength or harmonics thereof, along with a delivery system consisting of a telescoping and articulating tube which also contains an evacuation system for simultaneously sweeping up the debris produced in the process. The device embodies a personnel safety system which protects against accidental exposures. The system can be made extremely compact to foster such important applications as graffiti removal and hazardous coating removal. The uses of the invention include (i) removal of radioactive or other hazardous coatings from weapons or nuclear waste storage facilities, (ii) removal of hazardous Pb-based paints, (iii) graffiti removal from all surfaces, (iv) building restoration, (v) bridge restoration, (vi) boiler restoration, (vii) railroad track cleaning and (viii) ship, automobile and aircraft paint stripping.

DETAILED DESCRIPTION OF THE INVENTION

The invention is a device for removing surface coatings such as paint, pollution, hazardous materials from any surface at very high removal rates. An element of the invention is a laser that operates at very high average power and is based on a compact solid state laser amplifier concept for generating the high average power laser beam. The system is capable of delivering up to kW power levels either in a high pulse energy moderate repetition rate format, or a lower pulse energy high repetition rate format. The device consists of a high repetition rate solid state laser operated in the pulse length regime of 5 to 50 nsec and fluences of 0.1 to 1 J/cm$^2$. The high average power system incorporates an advanced beam correction technique involving stimulated Brillouin scattering (SBS) phase conjugation which provides for near diffraction limited beam quality at even the highest output powers and is described in U.S. Pat. No. 5,239,408, which is incorporated herein by reference. This allows the high average power beam to be manipulated conveniently with high damage threshold dielectric mirrors, which are less likely to damage at long propagation distances owing to the high beam quality. For many problems, effective coating removal may be obtained at the fundamental operating wavelength of the laser. In some situations it may be more effective to operate at shorter wavelengths. For these cases the laser system may contain one or more harmonic conversion crystals capable of operating at kW power levels and meant to convert the 1.06 μm fundamental wavelength of the laser to 0.53 μm, 0.35 μm or 0.25 μm harmonic wavelengths which may be more appropriate for different applications.

Figure 1:
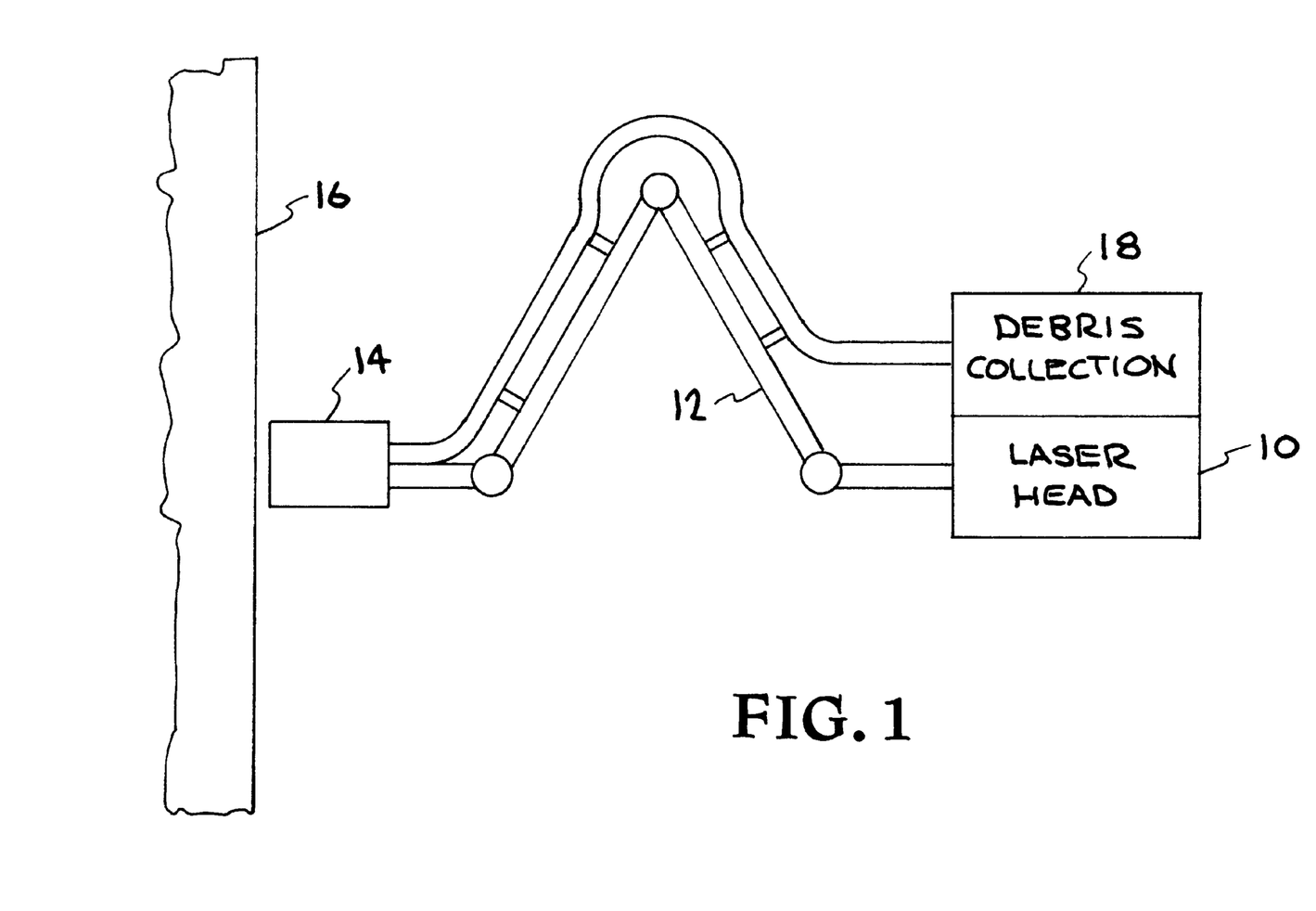
FIG. 1 shows a system overview.

FIG. 1 shows an overview of one embodiment of the high removal rate, laser-based coating removal system of the present invention. A high repetition rate solid state laser and amplifier are housed in a laser head 10, which provides laser energy into a telescoping and articulating tube 12 which directs the laser beam to the workhead 14 and work surface 16. A debris collection unit 18 is attached to workhead 14 to collect the product of the laser beam with the coating at the work surface 16. An additional robotic manipulator (not shown) may be used to position the workhead at the work surface, depending on the scale of the system.

In one embodiment, Laser head 10 comprises a laser amplifier having a gain medium and source of pump energy coupled with the gain medium; a polarization rotator, such as a Pockels cell, which rotates an incident beam in response to assertion of a control signal; an optical relay system which relays a first image plane near the gain medium to a second image plane near the rotator, and which relays the second image plane back near the gain medium; and a plurality of reflectors configured to define an optical path through the gain medium, optical relay system and rotator, such that each transit of the optical path includes at least one pass through the gain medium and only one pass through the rotator. Input means, and output means are provided, which may be implemented as a single polarizer, for coupling an input pulse into the optical path, and coupling an amplified pulse having a predetermined polarization out of the optical path. A control circuit is provided which is coupled to the rotator, for generating the control signal in timed relationship with the input pulse so that the input pulse is captured by the input means and it proceeds through at least one transit of the optical path, and then the pulse is rotated to the predetermined polarization, after which the captured pulse passes through the gain medium at least once more and is coupled out of the optical path by the output means before passing through the rotator again, to provide an amplified pulse. Various embodiments of this laser system are described in U.S. Pat. No. 5,285,310, which is incorporated herein by reference.

Figure 2:
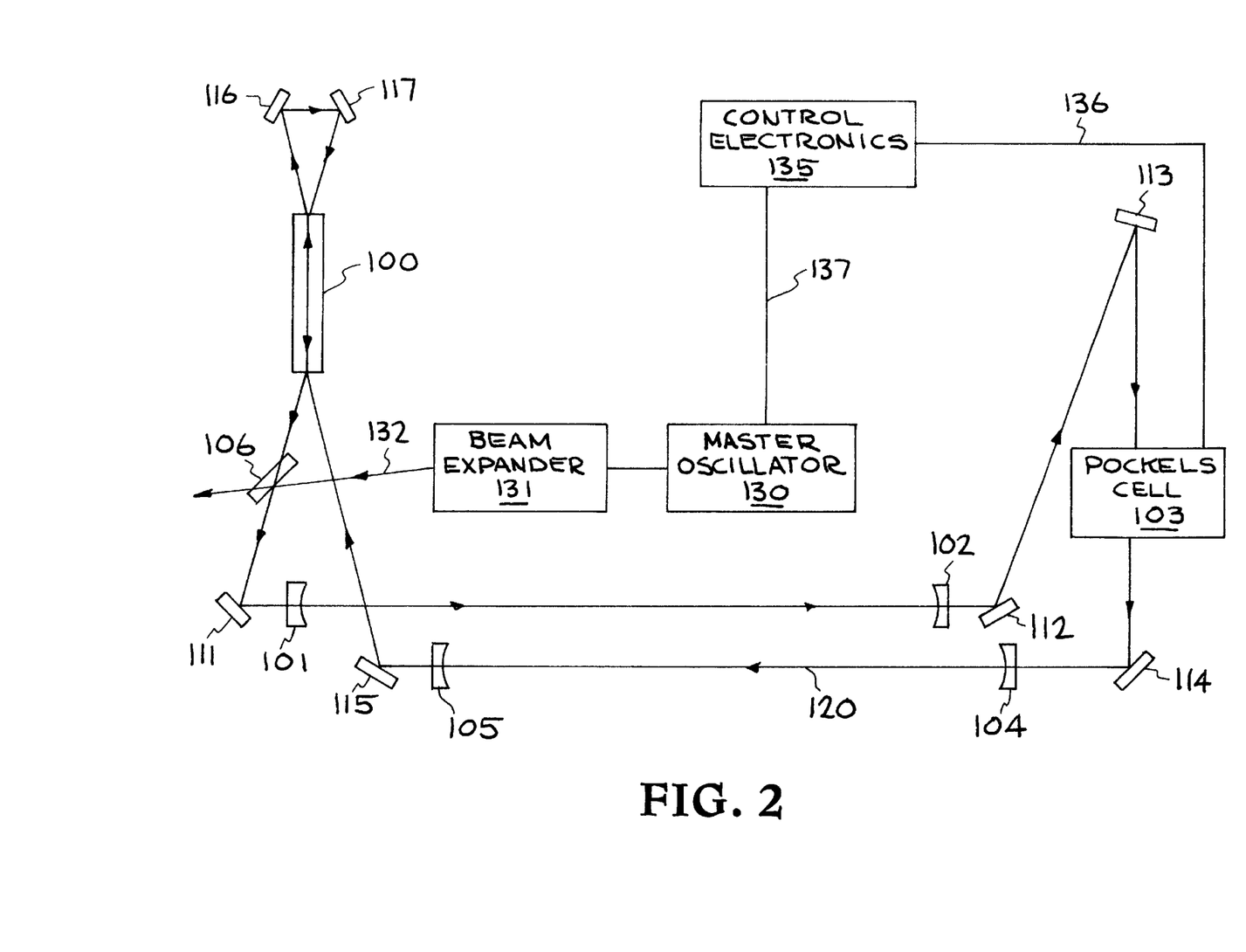
FIG. 2 shows an embodiment of the laser system of the present invention.

FIG. 2 illustrates the layout of the amplifier system according to the present invention. As can be seen, the amplifier includes a slab-shaped gain medium 100, a first relay telescope 101 arrow right 102 consisting of lenses 101 and 102, a Pockels cell 103, and a second relay telescope 104 arrow right 105 consisting of lenses 104 and 105. Also, a polarizer 106 is included for capturing an input pulse, and coupling an output pulse out of the optical path. Seven flat, high reflecting mirrors 111, 112, 113, 114, 115, 116, and 117 define an optical path, schematically represented by the line 120, through the slab 100, relays 101 arrow right 102 and 104 arrow right 105, and Pockels cell 103. Optional path 120 also proceeds through the polarizer 106.

A master oscillator 130 and beam expander 13 supply an input pulse along path 132. The input pulse has S polarization and reflects off the back of polarizer 106. It proceeds around the optical path through mirror 111, relay telescope 101 arrow right 102, mirrors 112 and 113 to the Pockels cell 103, Where its polarization is rotated by 90° to the P polarization. It then proceeds along the optical path to mirror 114 through relay 104 arrow right 105, off mirror 115 into the slab 100 where it is reflected by mirrors 116 and 117 back through the slab 100. Near unity fill of the pumped volume is accomplished by a first zig-zag pass and a second zig-zag pass which are essentially mirror images about the direction of propagation. In this way, the second zig-zag pass will tend to extract gain from regions that may have been missed in the first pass.

Because it had been rotated at the Pockels cell 103 from the S polarization to the P polarization, the beam leaving the second pass of the slab 100 is transmitted by polarizer 106 through the ring. As long as the polarization of the pulse remains in the P polarization, it will be captured in the ring for a plurality of transits. In the preferred system, it will transit the ring at least one more time, for third and fourth passes through the slab 100. In the next transit of the ring, the Pockels cell controlled by control electronics 135 switches the polarization from the P polarization to the S polarization. In the S polarization, the beam proceeds off of mirror 114 through telescope 104 arrow right 105, and off of mirror 115 for fifth and sixth passes through the slab 100. As it exits the slab 100, the pulse is reflected by the polarizer 106 as a high energy output pulse.

The characteristics of this amplifier configuration include the use of a single polarizer 106 within the optical path, a first telescope 101 arrow right 102 relays an image of the input aperture located near the slab 100 to a location near the Pockels cell 103, and a second telescope 104 arrow right 105 relays the image near the Pockels cell 103 back to near the slab 100. In this way, the slab 100 and polarizer 106 are near a first relay plane, and the Pockels cell 103 is near a second relay plane which have a relatively smooth distribution of power with minimal phase and amplitude perturbation. In addition, the pulse does not proceed through the Pockels cell or relay telescopes after the final two passes through the slab 100. This minimizes the average power seen by the Pockels cell 103 and relay telescopes 101 arrow right 102, 104 arrow right 105, and minimizes the risk that perturbations in the pulse will exceed the peak power thresholds of the Pockels cell or the telescopes 101 arrow right 102, 104 arrow right 105.

Thus, the amplifier illustrated in FIG. 2 exhibits low loss, with two slab passes per ring transit, and immediate output coupling of the high power beam before it passes through other lossy optical elements. It also exhibits a very high extraction efficiency because of multiple passes through the ring. This amplifier design has high optical tolerance because all optical components in the optical path are placed near images of the input aperture, minimizing the likelihood of high peak perturbations in the beam. Finally, a low Pockels cell power load is achieved because the polarization is switched before the final two slab passes during which one half to two thirds of the power is extracted from the slab.

The rotator is used to control the beam polarization to trap the beam within the ring by rotating it to a polarization transmitted by the polarizer, and then at an appropriate time couple it out by rotating the polarization to the predetermined polarization reflected by the polarizer. Thus, to extract a high power beam in the configuration of the present invention, the Pockels cell is controlled to rotate the beam from P to S polarization prior to the last two passes of the gain medium. In this configuration, the gain medium amplifies P polarization on initial passes through the ring, and amplifies S polarization on the last two passes. Immediately upon leaving the gain medium after the last two passes, the beam of S polarization is coupled out by the output polarizer. In a regenerative amplifier, such as that described according to the present invention, one half to two thirds of the power is extracted in the last two passes. Thus, this design results in minimal number of optical components in the optical path being exposed to the highest power laser energy.

In another aspect of the invention, there are at least two passes through the gain medium for each transit of the optical path. Furthermore, the gain medium includes first and second faces transverse to the optical path which permit transmission of light substantially independent of the polarization. This configuration allows for near unity fill of the gain medium, and thus, efficient extraction. In addition, the double pass significantly improves the gain to loss ratio of the ring, further improving the efficiency.

The amplifier configuration of the present invention involves, in effect, two relay telescopes. This allows the Pockels cell to be spaced a significant distance from the gain medium, but allows placement of all of the optical elements in the system near an image plane to minimize intensity spiking caused by diffraction and phase perturbations in the beam.

Yet another aspect of the invention arises in the placement of the Pockels cell, relay system, and output polarizer relative to the gain medium. In particular, the output polarizer is placed between the gain medium and the relay system so that the Pockels cell and the relay system are never loaded with the energy of the final two beam passes through the gain medium.

Other embodiments of laser head 10 are described in U.S. Pat. No. 5,239,408, which is incorporated herein by reference. In this embodiment, laser head 10 comprises an amplifier system which includes a ring shaped optical path with a limited number of components. The optical path includes an internal polarizer, a passive 90 degree phase rotator, a plurality of mirrors, a relay telescope, and a slab shaped gain medium. For inputting and outputting a pulse, the amplifier further includes a master oscillator, an external polarizer, and a one-way isolation rotator. The amplifier further includes a phase conjugator to enable reduction of phase aberrations.

In operation, a signal is input into the system at the external polarizer by a master oscillator which generates a beam with a polarization causing the beam to reflect off of the external polarizer. The beam will then proceed from the external polarizer through the isolation rotator, with no polarization change to enter the ring through the internal polarizer.

The pulse input into the ring shaped optical path is reflected by the internal polarizer and proceeds through a passive 90 degree phase rotator where polarization is rotated. The pulse then proceeds from the 90 degree phase rotator through first and second mirrors to a relay telescope. From the telescope, the beam proceeds through a third mirror into a gain medium, or slab where it is reflected by fourth and fifth mirrors back through the slab. From the slab, the beam is reflected off a sixth mirror back through the telescope and off a seventh mirror where it is reflected into the internal polarizer, thus completing one path around the ring.

The beam now having a polarization to pass through the internal polarizer will proceed for a second pass through the ring as described above. In the second pass, polarization rotation by the 90 degree rotator causes the beam to reflect off the internal polarizer into a stimulated Brillouin scattering (SBS) phase conjugator. The beam proceeding back out of the phase conjugator will also be reflected by the internal polarizer to proceed around the ring twice in the opposite direction.

After two passes around the ring in the opposite direction, polarization rotation by the 90 degree rotator causes the beam to reflect off of the internal polarizer out of the ring into the isolation rotator, e.g., Pockels cell. The isolation rotator rotates the polarization of the outgoing beam so that the beam will be output by the external polarizer.

The components of the present invention and their configuration as described above achieve reduced intensity spiking from diffraction and phase perturbations by first utilizing two paths around a ring shaped optical path before entering the SBS phase conjugator and two equal paths around the ring in the opposite direction but with reversed phase after exiting the SBS phase conjugator. The phase reversal and subsequent propagation through the amplifier results in essentially zero net phase aberration in the output beam.

Further, the Pockels cell is removed from the ring and replaced by a passive phase shifter so that no switching in the ring is required. A typical Pockels cell has approximately fourteen surfaces and will create more diffraction or phase perturbations than a two surface passive phase shifter. Also, with a passive phase shifter in the ring, the length of an input pulse may be as long as four times the distance of one transit of the ring. Also, with a passive phase shifter in the ring and a Faraday rotator replacing the input/output Pockels cell, no active switching is required and any length pulse can be amplified.

Another advantage of the amplifier configuration of the present invention is the placement of components near the telescope which involves, in effect, two relay telescopes. Use of the telescope of the present invention reduces diffraction caused by the significant distances between mirrors in the telescope of FIG. 1. Also, there are at least two passes through the slab for each transit of the optical path improving the gain to loss ratio of the ring.

Because of the combination of passive rotator and reflection (here by the phase conjugator) no Pockels cell switch is needed inside the ring. The configuration of components in the system allows the Pockels cell outside the ring to be an isolation Pockels cell which changes the beam phase as the beam passes through the Pockels cell in the direction only. Also, a passive Faraday rotator can be used.

Figure 3:
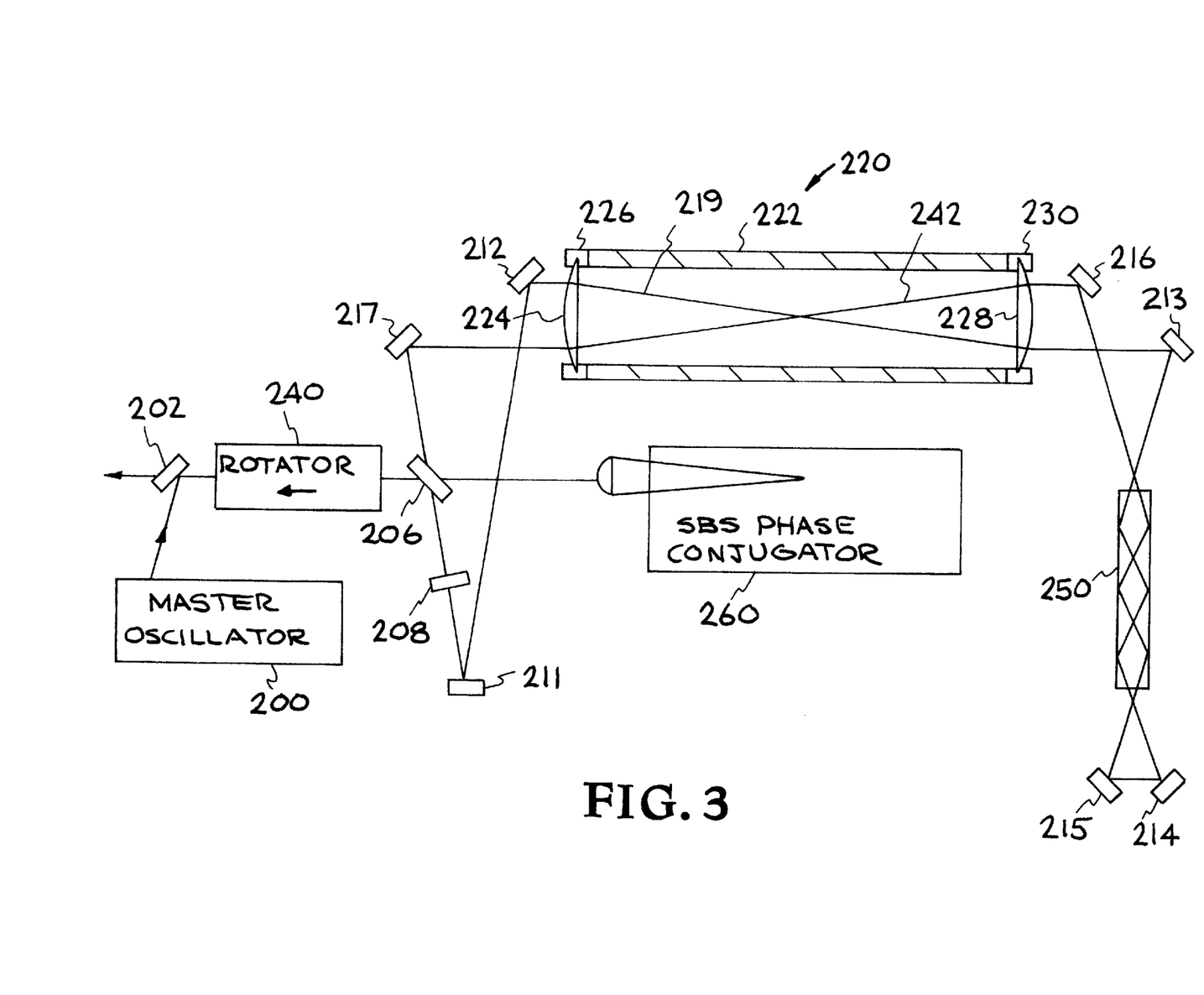
FIG. 3 shows another embodiment of the laser system of the present invention.

FIG. 3 is a schematic diagram of the regenerative laser amplifier according to the present invention. The amplifier of FIG. 3, includes a master oscillator 200, a rotator 240, such as a Pockels cell or Faraday rotator, a relay telescope 220, a slab-shaped gain medium 250, and an SBS phase conjugator 260. The slab 250 is enclosed in a pump cavity (not shown). Two polarizers 202 and 206 are also included for capturing an input pulse, and extracting an output pulse. Seven flat, highly reflecting mirrors 211, 212, 213, 214, 215, 216, and 217, define an optical path through the slab 250, and telescope 220, and polarizer 206 connects the ring to SBS phase conjugator 260.

In operation, a master oscillator 200 supplies an input pulse which has S polarization. The pulse reflects off polarizer 202, proceeds through an isolation Pockels cell 240 remaining unchanged in polarization, and is further reflected off polarizer 206 into a ring shaped optical path defined by mirrors 211–217.

In the ring, the beam enters the 90 degree rotator 208 which rotates the beam by 90° to the P polarization. The pulse proceeds through mirrors 211 and 212 along optical path 219 through relay telescope 220.

The telescope 220 includes a vacuum chamber 222 having a first lens 224 mounted by a vacuum tight seal 226, and a second lens 228 mounted by a vacuum tight seal 230. In an illustrative embodiment, each of the lenses 224 and 228 is a 1.2 meter focal length lens. The spacing between lenses 224 and 228 is approximately 2.4 meters adjusted so that the lens pair is afocal.

From telescope 220, the beam proceeds through mirror 213 into and through the slab 250 where it is reflected by mirrors 214 and 215 back through the slab 250. Near unity fill of the pumped volume is accomplished by a first zig-zag pass and a second zig-zag pass which are essentially mirror images about the direction of propagation. In this way, the second zig-zag pass will tend to extract gain from regions that may have been missed in the first pass.

From slab 250, the beam is reflected off mirror 216 along path 242 through telescope 220, off mirror 217 where it is reflected back into polarizer 206. Since the beam has been rotated by the 90 degree rotator 206 from the S polarization to the P polarization, the P polarized beam is transmitted by polarizer 206 to 90 degree rotator 208 to proceed through the ring a second time. However, during this second pass through the ring, 90 degree rotator rotates the polarization by 90° back to the S polarization. Therefore, when the beam reaches the polarizer 206 at the end of a second pass through the ring, it will be reflected into SBS phase conjugator 260.

The beam proceeding back out of the SBS phase conjugator, still having the S polarization, but reversed phase error will be reflected by polarizer 206 to mirror 217 where it will proceed along path 242 through telescope 220 to mirror 216. From mirror 216. From mirror 216, the beam will proceed through slab 250 a first time and be reflected back through the slab 250 a second time by mirrors 214 and 215. Proceeding out of slab 250, the beam will be reflected off mirror 213 and proceed back through telescope 220 and mirrors 212 and 211 to 90 degree rotator 208. The 90 degree rotator 208 will rotate the polarization by 90° back to the P polarization and transmit the beam to polarizer 206, thus completing a third pass through the ring, but this time in the reverse direction from the first two passes.

Since the beam has a P polarization, the beam will pass through polarizer 206 and proceed through the ring for a fourth pass through the ring, or a second pass in the reverse direction. At the end of this fourth pass through the ring, 90 degree rotator will rotate the polarization back to the S polarization causing the beam to reflect off of polarizer 206 out of the ring and into isolation Pockels cell 240. By this point, the net accumulated phase error is essentially zero. Isolation Pockels cell 240 or Faraday rotator will rotate the polarization of the beam to the P polarization enabling the beam to pass through polarizer 202 as a high energy output pulse.

Thus, the amplifier illustrated in FIG. 3 exhibits reduced diffraction, minimizing the likelihood of high peak perturbations in a beam, by utilizing two paths around the ring before entering the phase conjugator, and two equal and opposite paths around a ring after exiting the phase conjugator. The ring, further, utilizes a passive phase shifter instead of a Pockels cell. Additionally, all optical components are placed near the image planes by the use of two relay telescopes. The amplifier also exhibits higher gain to loss, with two slab passes per ring transit.

Other embodiments of laser head 10 are described in co-pending U.S. Pat. No. 5,689,653, entitled Long-Pulse-Width Narrow Bandwidth Solid State Laser, which is incorporated herein by reference. According to an embodiment disclosed therein, laser head 10 comprises a long pulse laser system that emits 500–1000 ns quasi-rectangular pulses at 527 nm with near diffraction-limited divergence and near transform-limited bandwidth. The system consists of one or more flashlamp-pumped Nd:glass zig-zag amplifiers, a very low threshold SBS phase conjugator system, and a free-running single frequency Nd:YLF master oscillator. Completely passive polarization switching provides eight amplifier gain passes. Multiple frequency output can be generated by using SBS cells having different pressures of a gaseous SBS medium or different SBS materials. This laser system produces a long pulse, low divergence, narrow-bandwidth, multi-frequency output. It is useful as an illuminator for long range speckle imaging applications. Because of its high average power and high beam quality, this system has application in any process which would requires a long pulse format, including material processing and medical applications.

Figure 4:
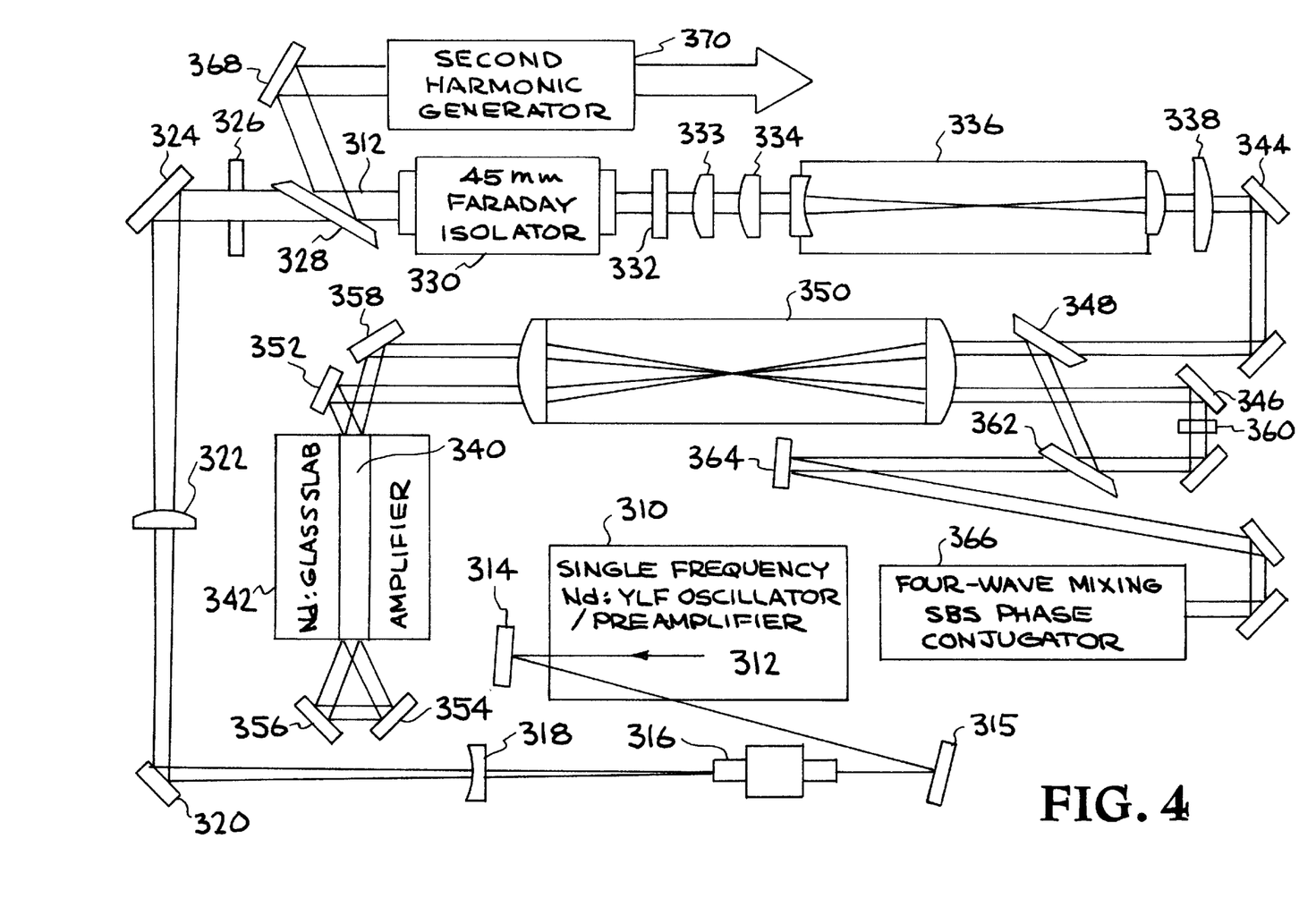
FIG. 4 shows another embodiment of the laser system of the present invention.

FIG. 4 is a schematic diagram of an embodiment of a long-pulse-width, narrow-bandwidth, solid state laser system according to the present invention. The figure shows an oscillator/preamplifier 310 comprising, e.g., a single frequency Nd:YLF laser oscillator or preamplifier. Oscillator/preamplifier 310 produces single frequency laser beam 312. In the Nd:YLF embodiment, beam 312 has a wavelength of 1054 nm, at 240 ns FWHM and typically 60 mJ of power. Upon exiting oscillator/preamplifier 310, beam 312 is polarized horizontally, i.e., parallel to the plane of the paper of FIG. 4. Beam 312 maintains this polarization as it reflects from turning mirror 314, passes through Faraday isolator 316 and negative lens 318, reflects from mirror 320, passes through positive collimating lens 322, reflects from mirror 324 and is masked by input mask 326. Polarizing beamsplitter 328 is oriented to transmit P-polarization, and thus, transmits horizontally polarized beam 312.

The directions of rotation of 45° Faraday isolator 330 and 45° quartz rotator 332 cancel each other in the input direction such that the beam which exits remains horizontally polarized (FIG. 4). Beam conditioning optics 332 and 334, anamorphic relay telescope 336 and collimating lens 338 prepare the beam size to fit the required aperture 340 of amplifier 342. Beam 312 reflects from mirrors 344 and 346 and transmits through polarizing beamsplitter 348 which is configured to transmit P-polarization and reflect S-polarization. The transmitter beam is relayed by 1:1 relay telescope 350 to a two-pass optical axis comprising mirrors 352, 354, 356 and 358. The amplifier 342 is place on axis with this two-pass optical axis. After passing through relay telescope 350 again, the polarization of beam 312 is rotated 90° by quartz rotator 360 to the vertical plane, i.e., perpendicular with respect to the plane of the paper. Beam 312 is then reflected by polarizing beamsplitter 362 to be re-injected into the amplification system by polarizing beamsplitter 328.

After two more amplification passes, the polarization of beam 312 (FIG. 4) is again rotated 90° allowing transmission through beamsplitter 362, reflection from mirror 364 and entrance into Four-wave mixing SBS phase conjugator 366, which reverses the phase of beam 312. Upon reversal of direction, beam 312 undergoes 4 more amplification passes and exits the system at polarizing beamsplitter 328, which is configured to reflect S-polarization. Mirror 368 directs beam 312 through second harmonic generator 370. If the preamplifier 310 produces a pulse at 60 mJ, 240 ns FWHM and 105.4 $\mu$m, the output from second harmonic generator will be a pulse of about 16 J, at greater than 500 ns and 527 nm wavelength.

The 45 degree Faraday and quartz rotator set result in a totally passively switched beam train. The beam enters the amplifier system from the oscillator through the anamorphic telescope which takes it from a square 25×25 mm size to the 8×120 mm required by the glass amplifier aperture. In this design, the output passes back through the same telescope, restoring the 25×25 mm square beam shape. The input beam enters the regenerative amplifier ring in p-polarization through a polarizing beamsplitter, and undergoes two gain passes. The polarization is then rotated 90 degrees by the quartz rotator and it now reflects from the same beamsplitter in s-polarization and undergoes two more gain passes. When the polarization is returned to the original p-state after the second pass through the rotator the beam is coupled out through a polarizing beamsplitter in the ring and directed into the SBS four-wave mixing conjugator. The reflected beam from the conjugator retraces the path of the input beam, resulting in four more gain passes for a total of eight. The polarization rotation of the 45 degree Faraday rotator and the 45 degree quartz rotator canceled each other in the input direction but now, in the output direction, they add resulting in a full 90 degree rotation, and the amplified beam is reflected off the first polarizing beamsplitter and enters the doubler.

The high average power laser systems described above can operate at the high repetition rate through the use of a laser diode pumping system. Laser diode pumping generates 3 to 5 times less heat in the crystal material than more conventional flashlamp pumping allowing for acceptable thermal loads within the laser as the repetition rate is moved up the desired kHz region. Because of thermal heat rejection limitations, commercially built laser diode systems are in general not able to achieve the high average power and high packing density required for this high rate application. Microchannel diode cooling, e.g., as described in U.S. Pat. Nos. 5,105,429 and 5,105,430, provides an extremely high rate of heat rejection (~1 kW/cm$^2$) and will allow realization of the high average power levels needed for this application. In one embodiment, the laser provides approximately 500 mJ/pulse output at 10 ns pulse length. U.S. Pat. Nos. 5,105,429 and 5,105,430 are incorporated herein by reference. Large area removal rates are achieved through high pulse repetition frequency, such as 1 to 4 kHz. The laser design most suitable for achieving these performance goals comprises a diode laser pumped Nd:YAG crystal system. The laser is configured as a master oscillator followed by a rectangular slab power amplifier. When running at high repetition rate and consequently high average power, the beam quality of laser systems tends to degrade severely due to aberrations generated by the thermal loading of the crystals. The SBS phase conjugation hardware automatically corrects the distortions in the beam and generates near diffraction limited output. A laser system with characteristics of 350 mJ/pulse, 800 Hz repetition rate and near diffraction limited beam quality has been demonstrated at Lawrence Livermore National Laboratory during the past two years.

In another embodiment, the laser provides approximately 20 J/pulse output at 10 ns pulse length. Large area removal rates are achieved through a combination of moderate pulse repetition frequency, such as 50 to 200 Hz, and a large laser irradiation spot or footprint. The laser design most suitable for achieving these performance goals comprises a flashlamp pumped Nd:glass. The laser is also configured as a master oscillator followed by a rectangular slab power amplifier. When running at high repetition rate and consequently high average power, the beam quality of laser systems tends to severely degrade due to aberrations generated by the thermal loading of the crystals. In this system the SBS phase conjugation hardware automatically corrects the distortions in the beam and generates near diffraction limited output.

Figure 5A:
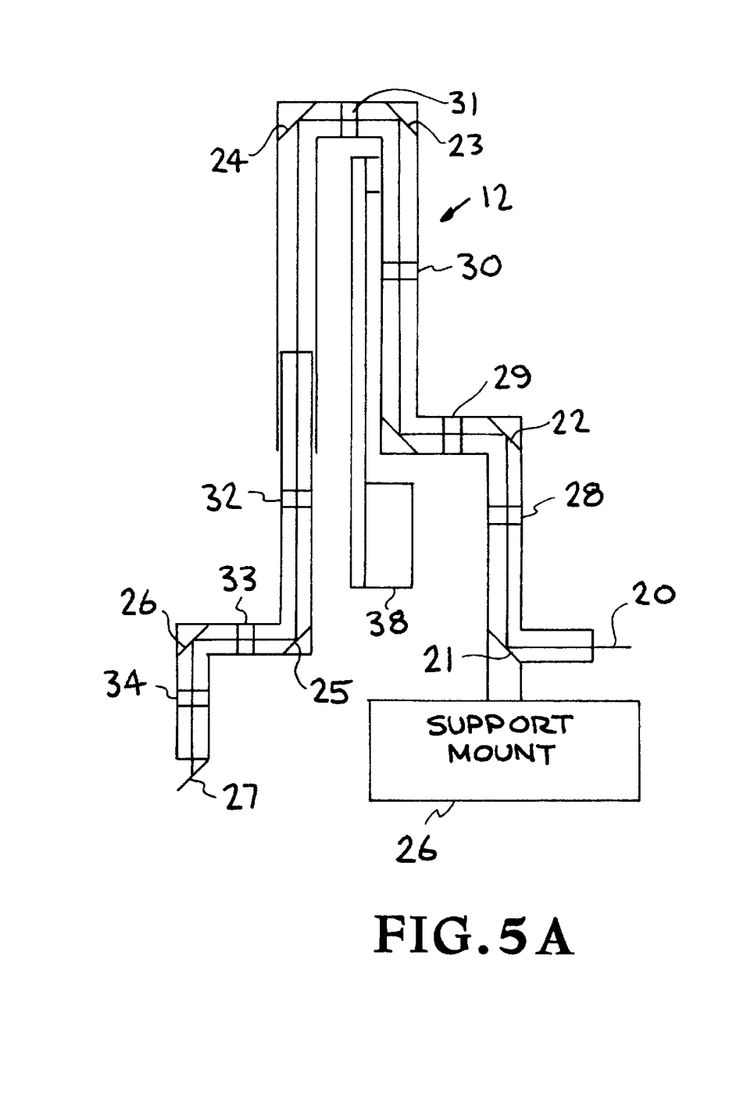
FIG. 5A shows a front view of the telescoping and articulating arm.
Figure 5B:
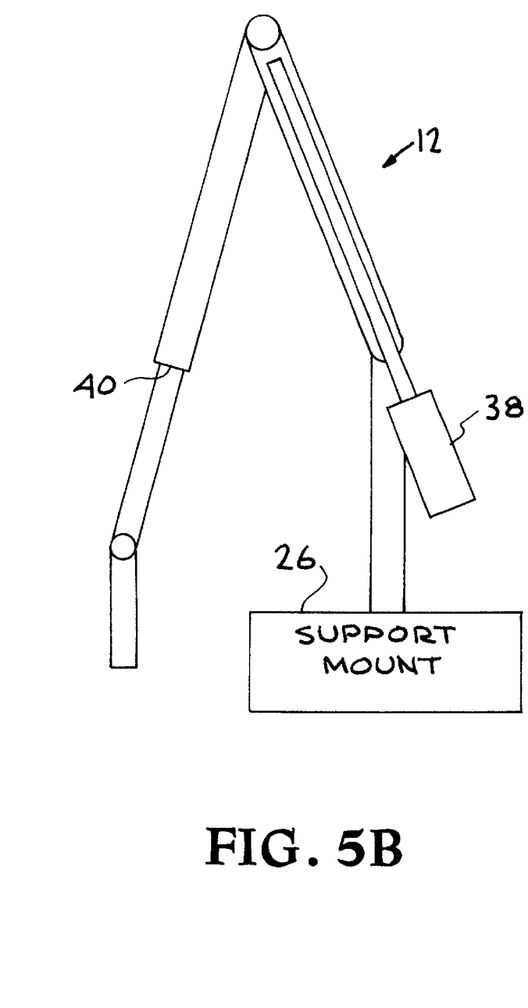
FIG. 5B shows a side view of the telescoping and articulating arm.

For coating removal applications, the high repetition rate laser is directed toward a coated surface by using a telescoping and articulated arm assembly which serves to encapsulate the laser light and allow it to be pointed in any direction. FIGS. 5A and 5B show a front view and a side view respectively of the telescoping and articulating arm. The debris collection unit 18 includes a flexible tube which is attached to articulating arm 12 for evacuating debris produced in the removal process. The evacuation system uses a convective air flow to capture and entrain debris coming from the surface. The collection unit uses filters to remove any microscopic particulates that may also be produced. A laser beam 20 from laser head 10 (FIG. 1) is reflected through a series of mirrors 21–27 mounted at 45 degrees. A series of ring bearings 28–34 allow unlimited rotation in several short sections between two 45 degree mirrors to provide an articulating joint. Several long sections can be joined together with a number of these short joints to provide a structure that can transport the beam to the workhead easily. The entire arm 12 is conveniently attached to a support mount 26 and is further balanced with a counter weight 38. The telescoping section 40 can be seen in FIG. 5B.

Figure 6:
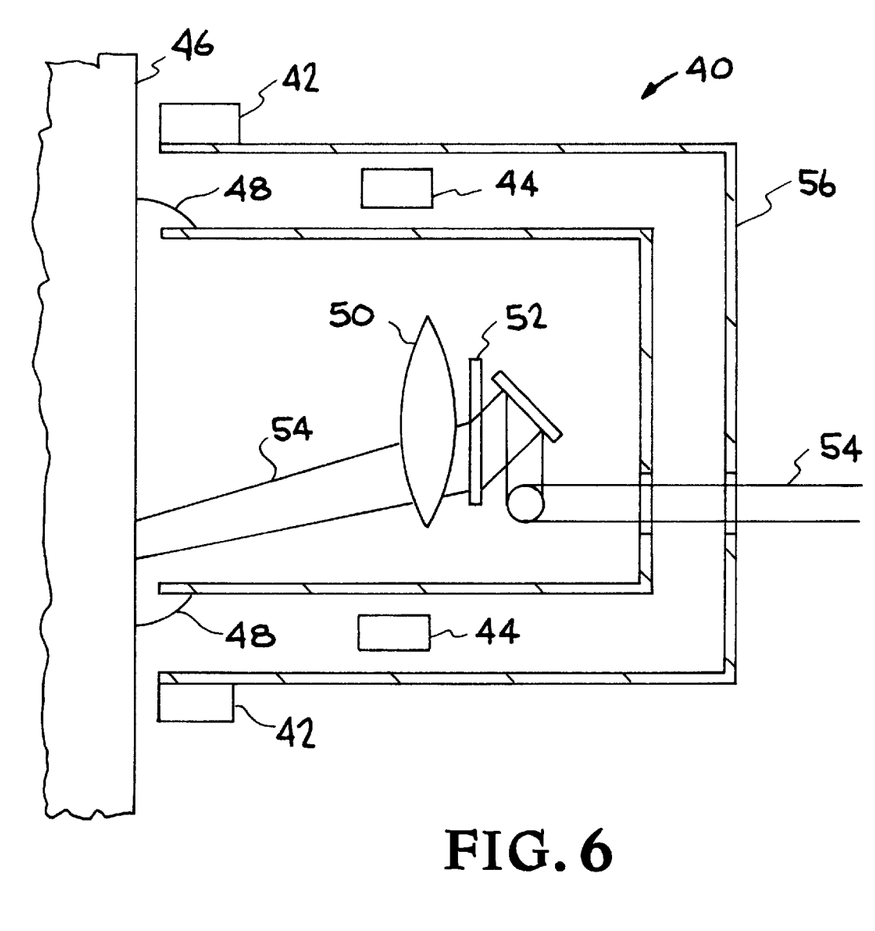
FIG. 6 shows an embodiment of the workhead.
Figure 8:
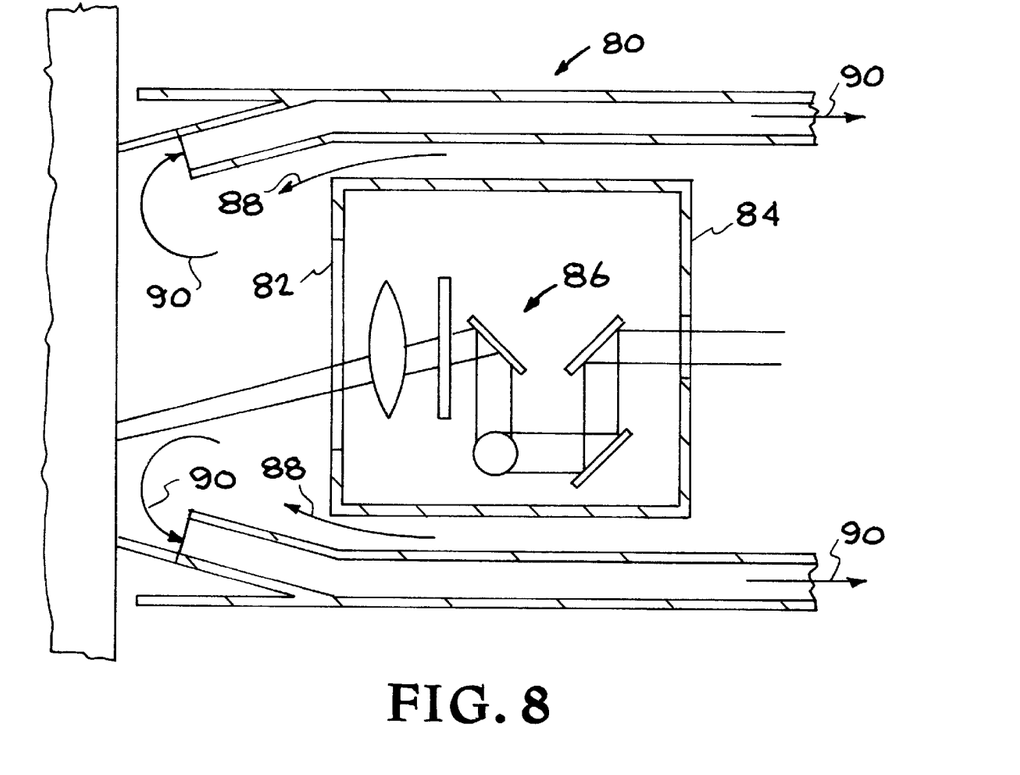
FIG. 8 shows the debris collection system at the workhead.

The workhead 14 (FIG. 1) is attached to the end of the articulating arm 12 and serves several functions including providing a means for the production of a uniform irradiation footprint on the target surface and a means to defocus the beam rapidly with distance. FIG. 6 shows the workhead 40 which includes a proximity sensor 42 and photosensor 44. This array of sensors is used to ensure that the workhead is positioned securely over the work surface 46. The proximity sensors 42 are part of an interlock system that renders the laser head inoperable unless there is an opaque surface directly under the workhead. The photosensors 44 monitor for dangerous levels of laser light that may escape past the internal baffle 48. A lens 50 in conjunction with a diffractive means 52 such as a kinoform phase plate, a random phase zone plate or other diffractive means reduce the spatial coherence of the laser beam 54. The phase plate 52 can be used to produce a very uniform beam intensity distribution at the work surface. This technology can be used to produce uniform laser focal distributions, and also to produce distributions having a special shape (e.g. square or rectangular). It also reduces the constraints on beam quality needed to get uniform removal over the spot. The workhead is shielded with an opaque, light absorbing shroud 56 that can be placed near the surface and which contains the laser light emerging from the articulated arm and also contains the debris produced in the cleaning process. This dual purpose protects the operator and bystanders from being harmed by either incident or reflected laser light, and reduces and contains hazardous waste products from being dispersed in the local environment. To ensure proper operation, the workhead sensors verify that the workhead is in close proximity to the surface being cleaned. FIG. 8 shows a view of the debris collection unit at the work head 80. In the figure, a debris shield 82 and enclosure 84 contain and protect the delivery optics 86. Convective air flow from the debris collection unit flows in the direction of the air flow arrows 88 toward the work surface. Air and entrained debris flow away from the work surface in the direction of air flow arrows 90.

Mirrors 58 and 60 of FIG. 6 are part of a system for high speed, galvanometer driven spatial rastering of the beam that moves the beam over the working area covered under the workhead, such that each pulse is directed at a fresh region of the target surface. The beam may be rastered across a given region of the target surface several times until the desired level of coating removal is achieved. A feedback system may be used in conjunction with the rastering system to control the amount of energy delivered to any given region of the surface, and terminate the cleaning operation when the appropriate layers have been removed.

Figure 7:
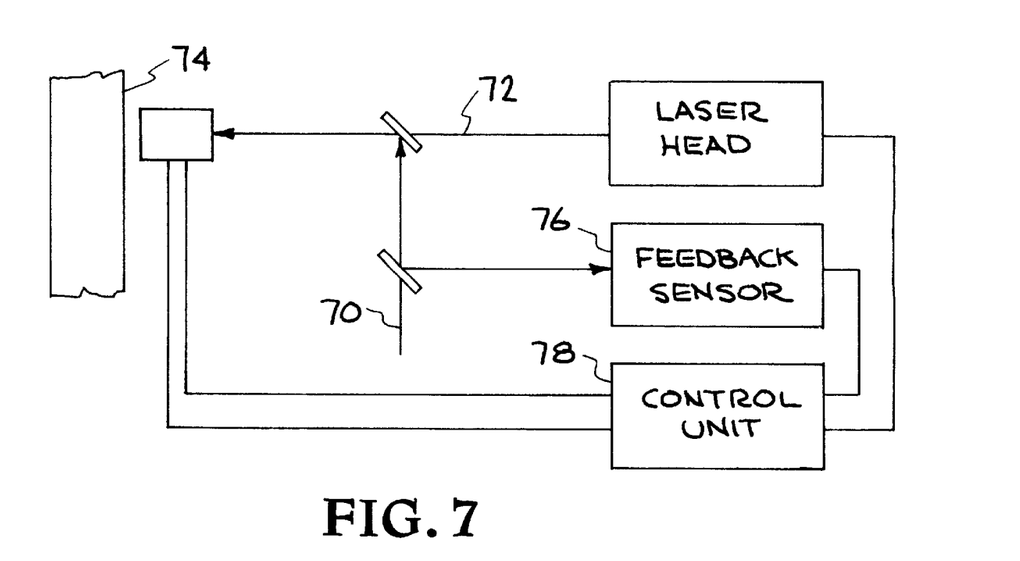
FIG. 7 shows a feedback control system.

Feedback control may be incorporated in the system using one of the methods described in prior art or using another method. A simple method that is effective for many applications where the albedo of the substrate is significantly larger than that of the absorbing layer (such as paint on a metal or concrete substrate) is to use a photodiode system to monitor the specular and diffuse reflected laser light. The feedback system would be adjusted to terminate cleaning of a particular surface region when the diffuse and/or specular reflectivity of the surface increases substantially and represents the characteristics of the underlying cleaned substrate and not the surface coating. Feedback control is used to control the laser firing and the scanning of the beam over the work surface. FIG. 7 shows an example of one type of feedback control system usable in the present invention. A probe illuminator beam 70 is directed through first and second beamsplitters to make the beam to be co-linear with the main laser beam 72. The portion of the beam 70 that is reflected back from the work surface 74 onto the feedback sensor 76 represents the amount of light reflected and scattered from the surface. As the surface is cleaned the reflected signal will indicate that and the control unit 78 will move the beam to the next part of the surface. The control unit also receives signals from proximity sensor 42 and photosensor 44 to shut the laser down if these interlock signals exceed a predetermine threshold.

Changes and modifications in the specifically described embodiments can be carried out without departing from the scope of the invention, which is intended to be limited by the scope of the appended claims.

The invention claimed is:

1. A coating removal system, comprising:

a laser to provide a laser beam, wherein said laser comprises:

at least one optical amplifier;

means for producing a polarized low power laser beam with an exponentially rising leading edge having a time constant $\tau$ determined from the formula $\tau=1/(dG(t)/dt) \sim P_o n/E_{sat}A$, where $G(t)$ is the time varying gain, $P_o$ is the output power, $n$ is the number of amplifier pulses, $E_{sat}$ is the saturation fluence of the gain media and $A$ is the cross sectional area of the amplifier;

at least one optical amplifier;

means for providing multiple amplification passes of said polarized low power laser beam, said multiple amplification passes propagating through said at least one optical amplifier to produce at least one amplified beam with nearly constant output power determined by said time constant of said exponentially rising leading edge of said polarized low power laser beam;

means for reversing the phase of said polarized low power laser beam and its propagation direction after half of said multiple amplification passes through said at least one optical amplifier, said reversing means including stimulated-Brillouin-scattering (SBS), wherein said amplified beam retraces its path and relative polarization through said at least one optical amplifier; and means for converting said at least one amplified beam into at least one output beam by passively switching the polarization of said at least one amplified beam;

wherein said coating removal system further comprises:

a workhead comprising means for delivering said laser beam to a work surface;

means for delivering said laser beam from said laser to said workhead; and means for collecting debris produced by the interaction of said laser beam with a coating located on said work surface.

2. The coating removal system of claim 1, wherein said means for delivering said laser beam to a work surface comprises a diffractive optic.

3. The coating removal system of claim 2, wherein said diffractive optic is selected from a group consisting of a kinoform phase plate and a random phase zone plate, wherein said diffractive optic reduces the spatial coherence of said laser beam and produces a very uniform beam intensity distribution at said work surface.

4. The coating removal system of claim 2, further comprising a focusing lens.

5. The coating removal system of claim 4, further comprising an enclosure and debris shield surrounding said focusing lens and said diffractive optic.

6. The coating removal system of claim 1, wherein said means for delivering said laser beam from said laser to said workhead comprises a telescoping and articulating arm.

7. The coating removal system of claim 6, wherein said telescoping and articulating arm comprises a counterweight.

8. The coating removal system of claim 1, wherein said means for delivering said laser beam to a work surface comprises a system for high speed, galvanometer driven spatial rastering of said laser beam, wherein said system moves said laser beam over said work surface.

9. The coating removal system of claim 8, further comprising a feedback system which may be used in conjunction with said system for high speed, galvanometer driven spatial mastering of said laser beam, wherein said feedback system comprises at least one photosensor, wherein said feedback system controls the amount of energy delivered to any given region of said work surface by monitoring laser energy levels at said photosensor, and wherein said feedback system terminates the cleaning operation when the appropriate layers have been removed.

10. The coating removal system of claim 1, wherein said means for delivering said laser beam to a work surface comprises an interlock system, further comprising at least one proximity sensor, wherein said interlock system shuts off or blocks said laser beam when said workhead is not within a prescribed distance from said work surface.

* * * * *